May 21, 1957 C. J. WESTLING 2,792,954
MATERIAL HANDLING DEVICE
Filed May 15, 1953 3 Sheets-Sheet 1

INVENTOR
CARL J. WESTLING

May 21, 1957 C. J. WESTLING 2,792,954
MATERIAL HANDLING DEVICE

Filed May 15, 1953 3 Sheets-Sheet 2

INVENTOR
CARL J. WESTLING

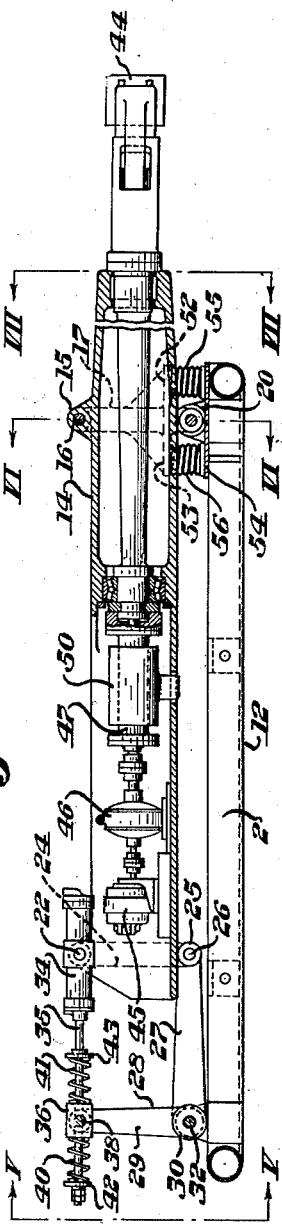
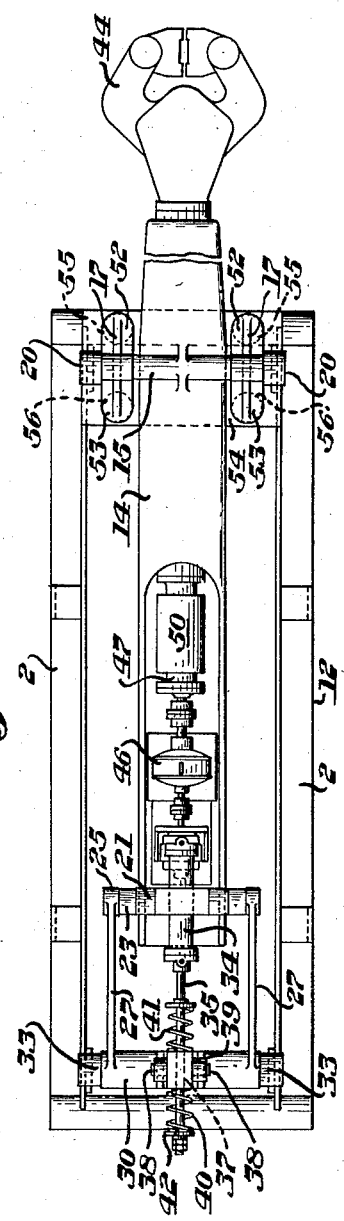
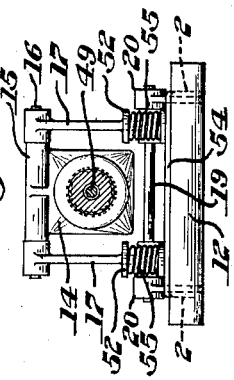
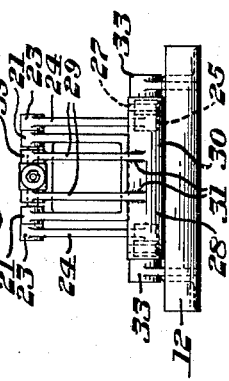
INVENTOR
CARL J. WESTLING

United States Patent Office 2,792,954
Patented May 21, 1957

2,792,954
MATERIAL HANDLING DEVICE

Carl J. Westling, Pittsburgh, Pa., assignor to Vulcan Research Corporation, Pittsburgh, Pa., a corporation of Pennsylvania Application May 15, 1953, Serial No. 355,212

18 Claims. (Cl. 214—147)

This invention relates to a material handling device and especially to a material handling device having characteristics well adapting it for use while mounted upon and carried by a straddle truck constituting a mobile support for the material handling device. The assembly as a whole including the straddle truck and the material handling device is claimed in my copending application Serial No. 355,211 filed of even date herewith, and now Patent No. 2,758,734. The claims of the present application are directed to the material handling device per se as distinguished from the assembly thereof with the straddle truck.

My material handling device is constituted so that it may be readily picked up by the load supporting means of a straddle truck and fastened thereto so that the vertical movement of the material handling device, including the load-carrying arm forming a part thereof, is effected through vertical movement of the load supporting means of the straddle truck. The material handling device, hereinafter sometimes called a "manipulator," which term is used as a term of broad definition and not as a term of limitation, may be designed to accomplish the normal functions of gripping and releasing work and the load-carrying arm, hereinafter sometimes called a "peel," which term is used as a term of broad definition and not as a term of limitation, may be mounted for turning movement about its own axis and for tilting, and means may be provided cushioning the manipulator and the straddle truck or other support therefor against shocks imparted to the peel in use of the manipulator. The manipulator is designed to occupy a minimum of headroom so that it is especially well adapted for use with a straddle truck, but the manipulator may be otherwise mounted while effectively performing its function.

I provide a manipulator comprising a support, a generally horizontally oriented peel and connections between the peel and the support through which the peel is carried by the support, the connections including a parallel motion linkage having links spaced apart longitudinally of the peel oriented generally vertically and means comprising a generally horizontally oriented operating member for changing the elevation of one of the longitudinally spaced links relatively to the other and thereby tilting the peel.

The peel may have its forward end projecting from the support and means may be provided for connecting the peel to the support, such means including a generally horizontal pivot extending transversely of the peel so that in use of the manipulator the peel may tilt about the pivot. I also preferably provide a generally horizontally oriented operating member and connections between the operating member and the peel rearwardly of the pivot for depressing or elevating the rearward portion of the peel to tilt the peel about the pivot.

In a preferred form of structure the connections between the peel and the support through which the peel is carried by the support include a parallel motion linkage having links spaced apart longitudinally of the peel oriented generally vertically and generally horizontally oriented cushioning means resiliently operable to permit change in elevation of one of the longitudinally spaced links relatively to the other upon application to the peel in use of the manipulator of a force tending to tilt the peel.

The connections between the peel and the support may include generally parallel links spaced apart longitudinally of the peel each pivoted to the peel and extending generally downwardly from its pivotal connection with the peel, one of the links being pivoted directly to the support at the lower portion of the link and the other link being indirectly connected with the support whereby the elevation of the second mentioned link relatively to the first mentioned link may be changed.

Each of the generally parallel links may be pivoted to the peel at one end of the link and one of the links may be pivoted directly to the support at the end of the link opposite the end which is pivoted to the peel and a lever may be provided which is pivoted to the support, the other link being pivoted to the lever. The lever may be a bell crank lever having a generally horizontally oriented arm and a generally vertically oriented arm, the second mentioned link being pivoted to the generally horizontally oriented arm of the bell crank lever. Means may be provided acting on the generally vertically oriented arm of the bell crank lever for turning the bell crank lever about its pivotal connection with the support. The last mentioned means may act between the generally vertically oriented arm of the bell crank lever and the pivotal connection of the second mentioned link to the peel whereby to relatively move such arm and pivotal connection. Cushioning means may be provided acting on the generally vertically oriented arm of the bell crank lever permitting turning of the bell crank lever about its pivotal connection with the support upon application to the peel in use of the manipulator of a force tending to tilt the peel. The cushioning means may be constructed and arranged so as to permit relative pivotal movement between the second mentioned link and the bell crank lever about the pivot connection between the second mentioned link and the generally horizontally oriented arm of the bell crank lever upon movement of the peel due to force applied to the peel in use of the manipulator.

My manipulator may comprise a support, a generally horizontally oriented peel and connections between the peel and the support through which the peel is carried by the support, the connections including generally parallel links spaced apart longitudinally of the peel each pivoted to the peel at one end of the link, one of the links being pivoted directly to the support at the end of the link opposite the end which is pivoted to the peel, a bell crank lever pivoted to the support and having a generally horizontally oriented arm and a generally vertically oriented arm, the other link being pivoted to the generally horizontally oriented arm of the bell crank lever, a cylinder trunnioned about one of (a) the axis of the pivotal connection between the second mentioned link and the peel and (b) the generally vertically oriented arm of the bell crank lever, a piston operable in the cylinder and a piston rod connected with the piston and with the other of (a) the axis of the pivotal connection between the second mentioned link and the peel and (b) the generally vertically oriented arm of the bell crank lever. In the form shown in the drawings the cylinder is trunnioned about the axis of the pivotal connection between the second mentioned link and the peel and the piston rod is connected with the generally vertically oriented arm of the bell crank lever. The piston rod may pass through a trunnioned sleeve and compression coil springs may be biased between the sleeve and the piston rod in both axial directions from the sleeve.

I preferably mount a motive unit on the peel so as in effect to form part of the peel for turning the work supporting means. The motive unit may constitute a motor mounted on the peel coaxially with the work supporting means.

My manipulator may comprise a support, a generally horizontally oriented peel, means for mounting the peel on the support including a generally vertically oriented link pivoted adjacent its upper end to the upper portion of the peel and adjacent its lower end to the support so that the link lies generally beside the peel, the peel having work supporting means turnable about the axis of the peel, and a motive unit disposed at substantially the same elevation as the peel and mounted on the peel so as in effect to form part of the peel for turning the work supporting means.

I also provide yieldable stabilizing means acting on the peel maintaining the peel normally substantially horizontal but yieldable during operation of the peel to permit operative movements thereof.

Other details, objects and advantages of the invention will become apparent as the following description of a present preferred embodiment thereof proceeds.

In the accompanying drawings I have shown a present preferred embodiment of the invention in which Figure 1 is a side elevational view of a straddle truck manipulator with a portion of the peel broken away;

Figure 3 is a fragmentary view partly in elevation and partly in vertical cross section of a portion of the straddle truck manipulator shown in Figure 1;

Figure 4 is a plan view of the structure shown in Figure 3;

Figure 5 is an end elevational view of the structure shown in Figure 3 taken at the line V—V of that figure;

Figure 6 is a vertical transverse cross-sectional view taken on the line VI—VI of Figure 3; and Figure 7 is a vertical transverse cross-sectional view taken on the line VII—VII of Figure 3.

Figure 1:
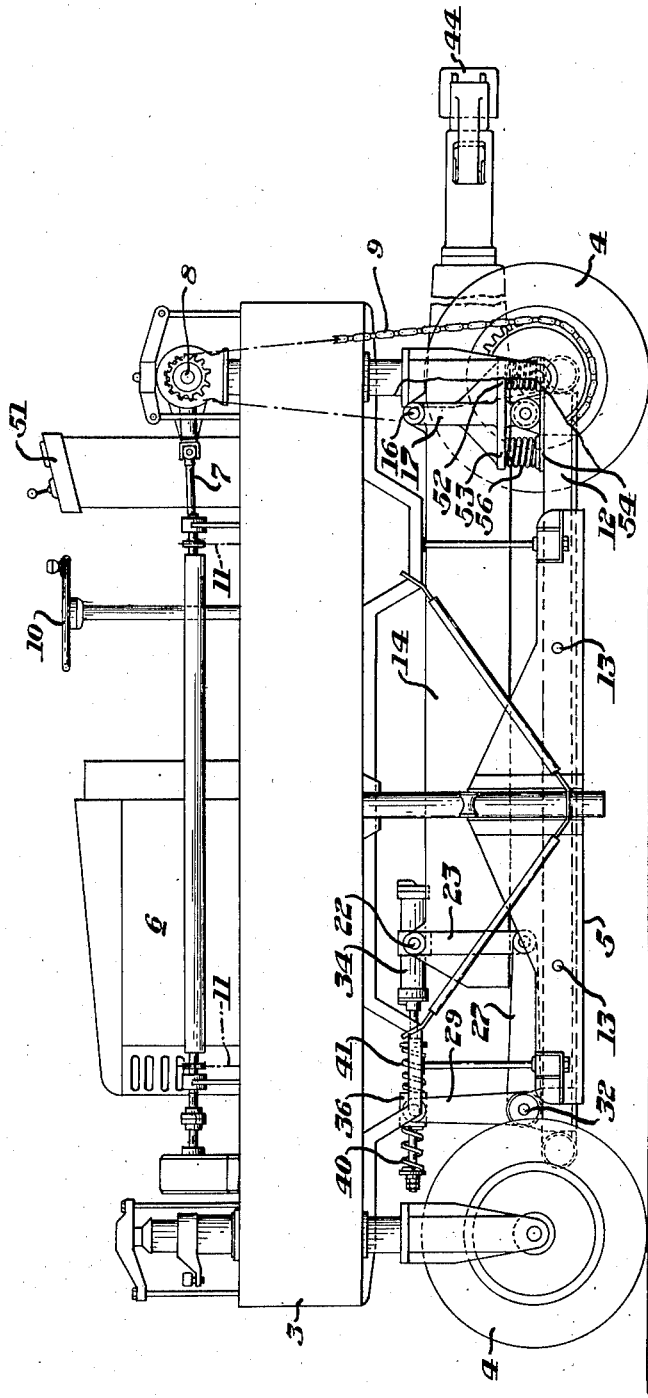

Referring now more particularly to the drawings, there is shown a straddle truck manipulator comprising side portions 2 and a top portion 3 joining the upper parts of the side portions and providing a space inside the side portions and beneath the top portion. Each of the side portions 2 is provided with longitudinally aligned rubber tired wheels 4 on which the manipulator may be moved about. Each of the side portions 2 has generally vertically movable load supporting means 5. The manipulator is provided with a motive unit such as an engine 6 which drives a hydraulic pump whose function will presently be described. The hydraulic pump may be closely coupled to the engine 6 and is not separately shown in the drawings. The engine 6 is connected through a drive shaft 7 with a transverse driven shaft 8 which through sprocket chains 9 drives the wheels 4 at one end of the manipulator. A steering gear controlled by a steering wheel 10 is provided for steering the manipulator in its movements from place to place. Desirably a conventional four-wheel steering gear is utilized. The engine 6 also has connections with chains 11 at the respective sides of the manipulator respectively connected with the load supporting means 5 for raising and lowering the load supporting means.

Everything above described is conventional in a straddle truck except the hydraulic pump. The other elements described are well understood by those skilled in the art and hence are not shown or their operation recited in detail. The load supporting means 5 may move only vertically or such means may be mounted for in and out or transverse movement if desired to aid in picking up and releasing the load. Such provision is conventional in straddle trucks and hence is not shown or described in detail.

I provide a manipulator unit comprising a supporting structure 12 which may be generally in the form of a horizontally oriented frame having longitudinally extending members at its respective sides which are adapted to be disposed upon the respective load supporting means 5. Each of the load supporting means 5 may be of angle form having a generally horizontal leg underlying the supporting structure and a generally vertical leg lying outside and adjacent the supporting structure. I preferably provide means adapted to be rendered operative and inoperative at will connecting the supporting structure with the load supporting means, such connecting means in the structure shown in the drawings constituting bolts 13. Thus the vertical movement of the manipulator unit is accomplished by generally vertical movement of the load supporting means 5 which in turn is accomplished by the engine 6 through the chains 11 as above explained.

The manipulator unit comprises a peel designated generally by reference numeral 14 which is mounted centrally of the supporting structure 12 and extends longitudinally of the manipulator. The peel is provided at its top with a bearing portion 15 to which are pivoted by a horizontal transverse pivot pin 16 generally downwardly vertically extending opposed links 17 each having at its lower end a sleeve 18. A pivot pin 19 passes through the sleeves 18 and also passes through bearing portions 20 of the supporting structure 12.

The peel 14 is also provided with bearing portions 21 through which respectively pass transversely aligned pivot pins 22. Each of the pins 22 also passes through a bearing portion 23 of one of a pair of opposed substantially vertical links 24 each having at its lower end a sleeve 25. A pivot pin 26 passes through the sleeves 25 and also passes through opposed horizontally extending arms 27 of a bell crank lever designated generally by reference numeral 28. The bell crank lever 28 has a pair of opposed generally vertically extending arms 29 which are connected with the arms 27 by a sleeve 30. The vertical arms 29 are welded to the sleeve 30 at 31. The arms 27 are also welded to the sleeve 30. Thus the bell crank lever 28 is constituted by the structure 27—29—30. A pin 32 passes through the sleeve 30 and also through bearing portions 33 of the supporting structure 12. Thus the bell crank lever 28 is pivoted to the supporting structure 12 and the links 24 are pivoted to the bell crank lever at the extremities of the horizontal arms 27 thereof, the links 24 in turn being pivoted to the peel. The links 24 are substantially or approximately parallel to the links 17 so that the links 17 and 24 form what may be termed a parallel motion linkage through which the peel is carried by the supporting structure. However, the parallel motion linkage is not a true parallelogram linkage since the links 24 may partake of slight angular movement relatively to the links 17 as will presently be described.

The inner ends of the pins 22 constitute trunnions for mounting a cylinder 34 in which operates a piston having a piston rod 35 connected therewith. I provide a block 36 having a bore 37 therethrough and trunnion pins 38 projecting therefrom at opposite sides. The trunnion pins 38 are disposed within bearing portions 39 at the upper ends of the vertically oriented links 29 of the bell crank lever 28. The piston rod 35 passes through the bore 37 and compression coil springs 40 and 41 are biased between the piston rod and the block 36 at opposite sides of the block. The spring 40 bears between the block 36 and a collar 42 on the piston rod while the spring 41 bears between the block 36 and a collar 43 on the piston rod.

The peel 14 carries tongs 44 which project from the manipulator for the handling of work as shown. The tongs are mounted for turning movement about the axis of the peel as is conventional, turning of the tongs being effected by a hydraulic motor 45 connected through a gear reducer 46 with a cylinder 47 containing a piston with which is connected a tongs operating rod 49. A sleeve manifold 50 is provided about the cylinder 47 for admitting and exhausting fluid at opposite sides of the piston in the cylinder regardless of the rotational position of the cylinder. Thus the tongs can be open and closed and turned in conventional manner in any position of the peel with respect to elevation or tilt.

I provide stabilizing means for normally maintaining the peel 14 substantially horizontal. Each of the opposed links 17 has integral therewith generally horizontally and longitudinally extending projections 52 and 53, the projections 52 extending forwardly and the projections 53 extending rearwardly. The downward faces of the projections 52 and 53 are disposed directly above and spaced a short distance from a pad portion 54 of the supporting structure 12. Compressed between the downward faces of the respective projections 52 and 53 and the pad portion 54 are compression coil springs 55 and 56, respectively. The springs 55 and 56 are continuously under compression and maintain the peel normally in the position shown in the drawings. The springs are adapted to be compressed to permit movements of the peel presently to be described.

The piston in the cylinder 34 is for the purpose of tilting the peel. When that piston is moved toward the right viewing Figures 1, 3 and 4 the spring 40 is compressed, the bell crank lever 28 is turned in the clockwise direction, the right-hand end of the peel is tilted upwardly and the springs 56 are compressed. When the piston in the cylinder 34 is moved toward the left viewing Figures 1, 3 and 4 the spring 41 is compressed, the bell crank lever 28 is turned in the counterclockwise direction, the right-hand end of the peel is tilted downwardly and the springs 55 are compressed. The springs 40 and 41 act as shock absorbers to relieve the manipulator as a whole of shocks imparted to the peel when the manipulator is in use. When the right-hand end of the peel viewing Figures 1, 3 and 4 is subjected to a downward force the peel tends to tilt about the pin 16 turning the bell crank lever 28 in the counterclockwise direction and compressing the spring 40. When the right-hand end of the peel viewing Figures 1, 3 and 4 is subjected to an upward force the peel tends to tilt about the pin 16 turning the bell crank lever 28 in the clockwise direction and compressing the spring 41. The springs 55 and 56 also have a shock absorbing function.

The cylinder 34 and block 36 may be reversed in position if desired without affecting the operation of the manipulator; that is to say, the cylinder 34 may be mounted on the vertical arms of the bell crank lever 28 and the block 36 may be mounted where the cylinder 34 is shown as being mounted.

As mentioned above a hydraulic pump is mounted in connection with the engine 6 and is driven thereby. The hydraulic pump is connected with the cylinder 34 and with the cylinder 47 through the manifold 50 and also with the motor 45. If the manipulator unit is made separate and removable from the straddle truck the fluid connections between the pump and the cylinders are readily connectable and disconnectable. In any event, they are flexible to allow for the relative movement of the parts as above explained.

The springs 40 and 41 also act to absorb shocks imparted lengthwise of the peel. If, for example, the peel is subjected to a shock at its right-hand end viewing Figures 1, 3 and 4 forcing it toward the left the links 17 and 24 tend to tilt in the counterclockwise direction about the respective pivot pins 19 and 26 and the spring 41 is compressed.

Figure 2:
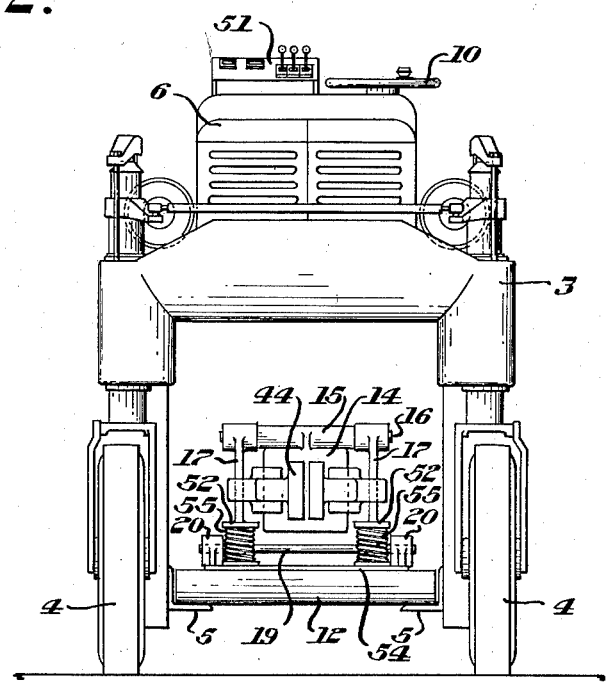
Figure 2 is a front elevational view of the straddle truck manipulator shown in Figure 1.

The manipulator controls may be located in a pulpit 51 mounted atop the manipulator as shown in Figures 1 and 2, giving the operator clear vision of the tongs and the work carried thereby. The straddle truck manipulator is economical of space and the manipulator unit is of low cost and may be made adaptable to any conventional straddle truck. The manipulator structure shown and described is especially well adapted for use in a straddle truck since its vertical height is kept to a minimum so as not to unduly limit the possible vertical movement of the manipulator unit beneath the top portion 3 of the straddle truck.

While I have shown and described a present preferred embodiment of the invention it is to be distinctly understood that the invention is not limited thereto but may be otherwise variously embodied within the scope of the following claims.

I claim:

1. A material handling device comprising a support, a generally horizontally oriented load-carrying arm and connections between the arm and the support through which the arm is carried by the support, the connections including a parallel motion linkage having links spaced apart longitudinally of the arm oriented generally vertically and means comprising a generally horizontally oriented operating member for changing the elevation of one of the longitudinally spaced links relatively to the other and thereby tilting the arm.

2. A material handling device comprising a support, a generally horizontally oriented load-carrying arm having its forward end projecting from the support, means including a generally horizontal pivot extending transversely of the arm connecting the arm to the support so that in use of the device the arm may tilt about the pivot, a generally horizontally oriented operating member and connections between the operating member and the arm disposed entirely rearwardly of the pivot for depressing or elevating the rearward portion of the arm to tilt the arm about the pivot.

3. A material handling device comprising a support, a generally horizontally oriented load-carrying arm and connections between the arm and the support through which the arm is carried by the support, the connections including a parallel motion linkage having links spaced apart longitudinally of the arm oriented generally vertically and generally horizontally oriented cushioning means resiliently operable to permit change in elevation of one of the longitudinally spaced links relatively to the other upon application to the arm in use of the device of a force tending to tilt the arm.

4. A material handling device comprising a support, a generally horizontally oriented load-carrying arm and connections between the arm and the support through which the arm is carried by the support, the connections including a parallel motion linkage having links spaced apart longitudinally of the arm oriented generally vertically, means comprising a generally horizontally oriented operating member for changing the elevation of one of the longitudinally spaced links relatively to the other and thereby tilting the arm and cushioning means resiliently operable to permit change in elevation of said link relatively to the other link upon application to the arm in use of the device of a force separate from force exerted by the operating member to tilt the arm.

5. A material handling device comprising a support, a generally horizontally oriented load-carrying arm and connections between the arm and the support through which the arm is carried by the support, the connections including generally parallel links spaced apart longitudinally of the arm each pivoted to the arm and extending generally downwardly from its pivotal connection with the arm, one of the links being pivoted directly to the support at the lower portion of the link and the other link being indirectly connected with the support whereby the elevation of the second mentioned link relatively to the first mentioned link may be changed.

6. A material handling device comprising a support, a generally horizontally oriented load-carrying arm and connections between the arm and the support through which the arm is carried by the support, the connections including generally parallel links spaced apart longitudinally of the arm each pivoted to the arm at one end of the link, one of the links being pivoted directly to the support at the end of the link opposite the end which is pivoted to the arm, and a lever pivoted to the support, the other link being pivoted to the lever.

7. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, and means acting on the generally vertically oriented arm of the bell crank lever for turning the bell crank lever about its pivotal connection with the support.

8. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, and means acting between the generally vertically oriented arm of the bell crank lever and the pivotal connection of the second mentioned link to the load-carrying arm adapted to relatively move the generally vertically oriented arm and pivotal connection.

9. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, and cushioning means acting on the generally vertically oriented arm of the bell crank lever permitting turning of the bell crank lever about its pivotal connection with the support upon application to the load-carrying arm in use of the device of a force tending to tilt the load-carrying arm.

10. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, and means acting between the generally vertically oriented arm of the bell crank lever and the pivotal connection of the second mentioned link to the load-carrying arm adapted to relatively move such arm and pivotal connection, said last mentioned means including cushioning means permitting relative pivotal movement between the second mentioned link and the bell crank lever about the pivotal connection between the second mentioned link and the generally horizontally oriented arm of the bell crank lever upon movement of the load-carrying arm due to force applied to the load-carrying arm in use of the device.

11. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, a cylinder trunnioned about one of the axis of the pivotal connection between the second mentioned link and the load-carrying arm and the generally vertically oriented arm of the bell crank lever, a piston operable in the cylinder and a piston rod connected with the piston and with the other of the axis of the pivotal connection between the second mentioned link and the load-carrying arm and the generally vertically oriented arm of the bell crank lever.

12. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, a cylinder trunnioned about the axis of the pivotal connection between the second mentioned link and the load-carrying arm, a piston operable in the cylinder and a piston rod connected with the piston and with the generally vertically oriented arm of the bell crank lever.

13. A material handling device comprising a support, a generally horizontally oriented load-carrying arm and connections between the load-carrying arm and the support through which the load-carrying arm is carried by the support, the connections including generally parallel links spaced apart longitudinally of the load-carrying arm each pivoted to the load-carrying arm at one end of the link, one of the links being pivoted directly to the support at the end of the link opposite the end which is pivoted to the load-carrying arm, a bell crank lever pivoted to the support and having a generally horizontally oriented arm and a generally vertically oriented arm, the other link being pivoted to the generally horizontally oriented arm of the bell crank lever, a cylinder trunnioned about one of the axis of the pivotal connection between the second mentioned link and the load-carrying arm and the generally vertically oriented arm of the bell crank lever, a piston operable in the cylinder, a sleeve trunnioned about the other of the axis of the pivotal connection between the second mentioned link and the load-carrying arm and the generally vertically oriented arm of the bell crank lever, a piston rod connected with the piston and passing through the sleeve and compression coil springs biased between the sleeve and the piston rod in both axial directions from the sleeve.

14. A material handling device comprising a support, a generally horizontally oriented load-carrying arm, means including a generally horizontal pivot extending transversely of the arm connecting the arm to the support so that in use of the device the arm may tilt about the pivot, the arm having work supporting means turnable about the axis of the arm, and a motive unit mounted on the arm coaxially therewith so as in effect to form part of the arm for turning the work supporting means.

15. A material handling device comprising a support, a generally horizontally oriented load-carrying arm, means including a generally horizontal pivot extending transversely of the arm connecting the arm to the support so that in use of the device the arm may tilt about the pivot, the arm having work supporting means turnable about the axis of the arm, and a motor mounted on the arm coaxially with the work supporting means for turning the work supporting means.

16. A material handling device comprising a support, a generally horizontally oriented load-carrying arm, means for mounting the arm on the support including a generally vertically oriented link pivoted adjacent its upper end to the upper portion of the arm and adjacent its lower end to the support so that the link lies generally beside the arm, the arm having work supporting means turnable about the axis of the arm, and a motive unit disposed at substantially the same elevation as the arm and mounted on the arm so as in effect to form part of the arm for turning the work supporting means.

17. A material handling device comprising a support, a generally horizontally oriented load-carrying arm and connections between the load-carrying arm and the support through which the load-carrying arm is carried by the support, the connections including a generally vertically oriented link pivoted adjacent its upper end to the upper portion of the load-carrying arm and adjacent its lower end to the support so that the link lies generally beside the load-carrying arm and a bell crank lever pivoted to the support and having a generally horizontally oriented arm and a generally vertically oriented arm, the generally horizontally oriented arm of the bell crank lever being connected to the load-carrying arm, the generally vertically oriented arm of the bell crank lever being disposed at the same general elevation as the load-carrying arm, and means for moving the generally vertically oriented arm of the bell crank lever to tilt the load-carrying arm.

18. A material handling device comprising a support, a generally horizontally oriented load-carrying arm having its forward end projecting from the support, means mounting the arm on the support for operative movements including tilting movements and yieldable stabilizing means acting on the arm in opposite directions maintaining the arm normally substantially horizontal.

References Cited in the file of this patent
UNITED STATES PATENTS

| | | |
|---|---|---|
| 1,334,000 | Soderstrom | Mar. 16, 1920 |
| 1,881,169 | Brosius | Oct. 4, 1932 |
| 2,257,546 | Dienenthal et al. | Sept. 30, 1941 |
| 2,301,579 | Plant et al. | Nov. 10, 1942 |
| 2,314,686 | Brosius | Mar. 23, 1943 |
| 2,345,572 | Brosius | Apr. 4, 1954 |
| 2,675,934 | Kennedy | Apr. 20, 1954 |
| 2,677,475 | Davies et al. | May 4, 1954 |